(12) United States Patent
Martin

(10) Patent No.: US 9,599,998 B2
(45) Date of Patent: Mar. 21, 2017

(54) GRAIN PIPE VALVE ASSEMBLY

(71) Applicant: Clinton Martin, Newmanstown, PA (US)

(72) Inventor: Clinton Martin, Newmanstown, PA (US)

( * ) Notice: Subject to any disclaimer, the term of this patent is extended or adjusted under 35 U.S.C. 154(b) by 29 days.

(21) Appl. No.: 14/692,882

(22) Filed: Apr. 22, 2015

(65) Prior Publication Data
US 2016/0313745 A1   Oct. 27, 2016

(51) Int. Cl.
*B65G 11/20* (2006.01)
*G05D 9/12* (2006.01)
*F16K 15/02* (2006.01)

(52) U.S. Cl.
CPC .............. *G05D 9/12* (2013.01); *F16K 15/02* (2013.01)

(58) Field of Classification Search
CPC .............................. B65G 11/20; B65G 11/206
USPC ........ 198/525, 530, 532; 193/18, 20, 21, 29, 193/31 A; 222/380, 547, 630
See application file for complete search history.

(56) References Cited

U.S. PATENT DOCUMENTS

| | | | | |
|---|---|---|---|---|
| 2,694,515 A * | 11/1954 | Green | .................. | B65B 1/28 141/300 |
| 3,739,893 A * | 6/1973 | Kaufmann | ............ | B65G 69/186 141/93 |
| 4,029,220 A * | 6/1977 | Greaves | ..................... | F27B 1/20 193/29 |
| 4,276,975 A * | 7/1981 | Jenkins | ..................... | B60P 3/16 180/41 |
| 4,412,762 A | 11/1983 | Lepley et al. | | |
| 4,635,476 A | 1/1987 | Haynes | | |
| 4,863,040 A * | 9/1989 | Sandi | ..................... | B07C 5/362 193/31 A |
| 5,904,270 A * | 5/1999 | Schwartz | ........... | B65G 69/0475 141/198 |
| 6,378,688 B1 * | 4/2002 | Fitzgerald | .............. | B65G 27/04 198/360 |
| 6,425,529 B1 * | 7/2002 | Reinsch | .............. | A01M 7/0092 239/10 |
| 6,923,340 B2 * | 8/2005 | Ambs | ................. | B65B 69/0075 222/105 |
| 7,293,585 B2 * | 11/2007 | Mahoney | ............ | B65B 69/0083 141/114 |
| 7,296,919 B2 | 11/2007 | Petersen et al. | | |
| 7,910,074 B2 | 3/2011 | Li et al. | | |
| 8,881,885 B2 * | 11/2014 | Nakamura | .............. | C30B 29/06 193/15 |
| 2007/0090132 A1 | 4/2007 | Williams et al. | | |

* cited by examiner

Primary Examiner — Douglas Hess

(57) ABSTRACT

A grain pipe valve assembly maintains a desired level of flow restriction through a grain pipe. The assembly includes a valve couplable to a downspout. The valve is positionable proximate a lower end of the downspout. The valve has a swivel gate selectively extendable into the downspout wherein the swivel gate inhibits flow of grain through the downspout. A sensor is couplable to the downspout in spaced relationship to the valve towards the upper end of the downspout to detect when backflow of grain reaches a predetermined level in the downspout. The sensor is operationally coupled to the valve wherein the swivel gate is controlled and extended into the downspout to maintain backflow of grain to the predetermined level in the downspout.

12 Claims, 9 Drawing Sheets

GRAIN PIPE VALVE ASSEMBLY

BACKGROUND OF THE DISCLOSURE

Field of the Disclosure

The disclosure relates to valve devices and more particularly pertains to a new valve device for maintaining a desired level of flow restriction through a grain pipe.

SUMMARY OF THE DISCLOSURE

An embodiment of the disclosure meets the needs presented above by generally comprising a valve couplable to a downspout. The valve is positionable proximate a lower end of the downspout. The valve has a swivel gate selectively extendable into the downspout wherein the swivel gate inhibits flow of grain through the downspout. A sensor is couplable to the downspout in spaced relationship to the valve towards the upper end of the downspout to detect when backflow of grain reaches a predetermined level in the downspout. The sensor is operationally coupled to the valve wherein the swivel gate is controlled and extended into the downspout to maintain backflow of grain to the predetermined level in the downspout.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
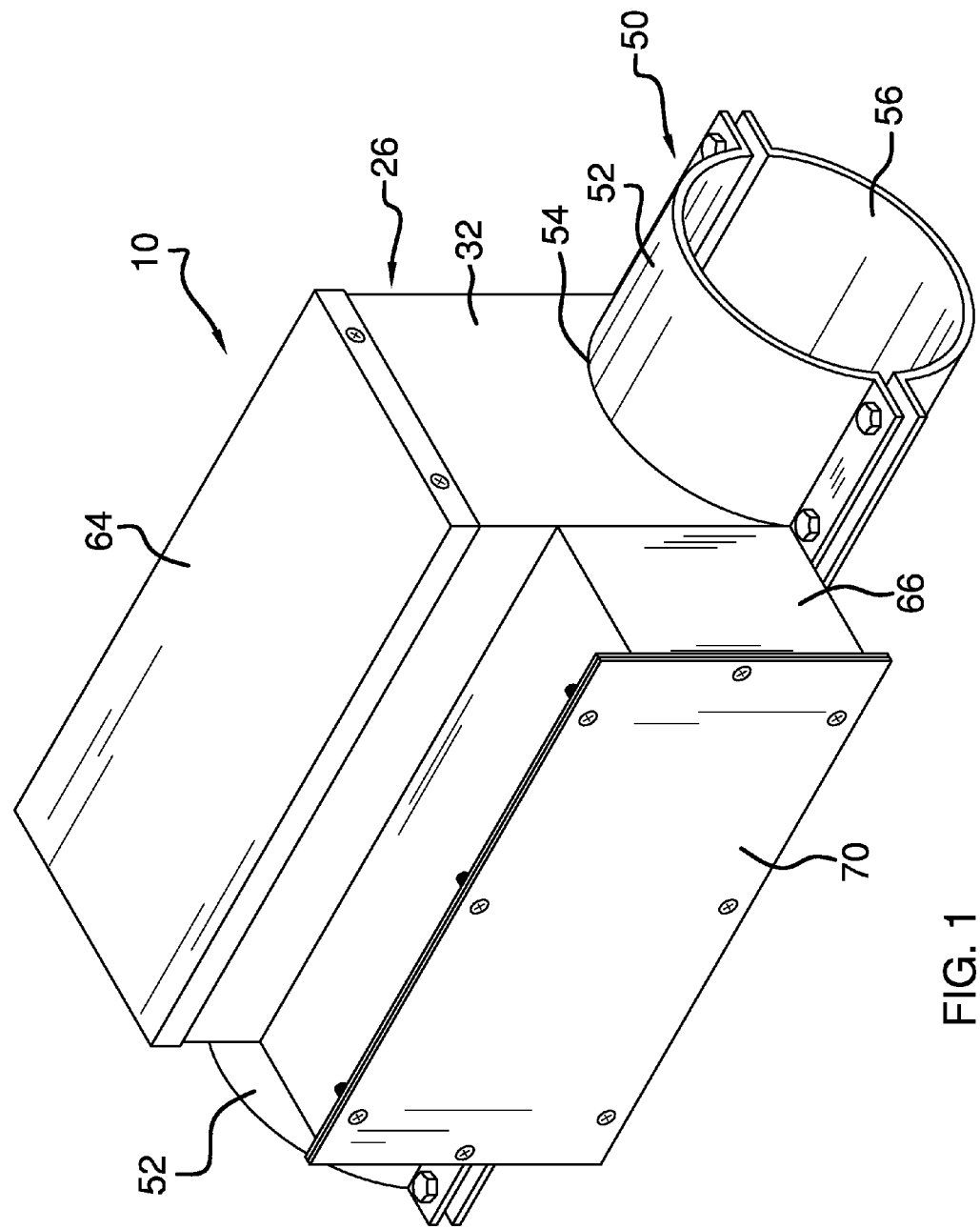
FIG. 1 is a top front side perspective view of a grain pipe valve assembly according to an embodiment of the disclosure.
Figure 2:
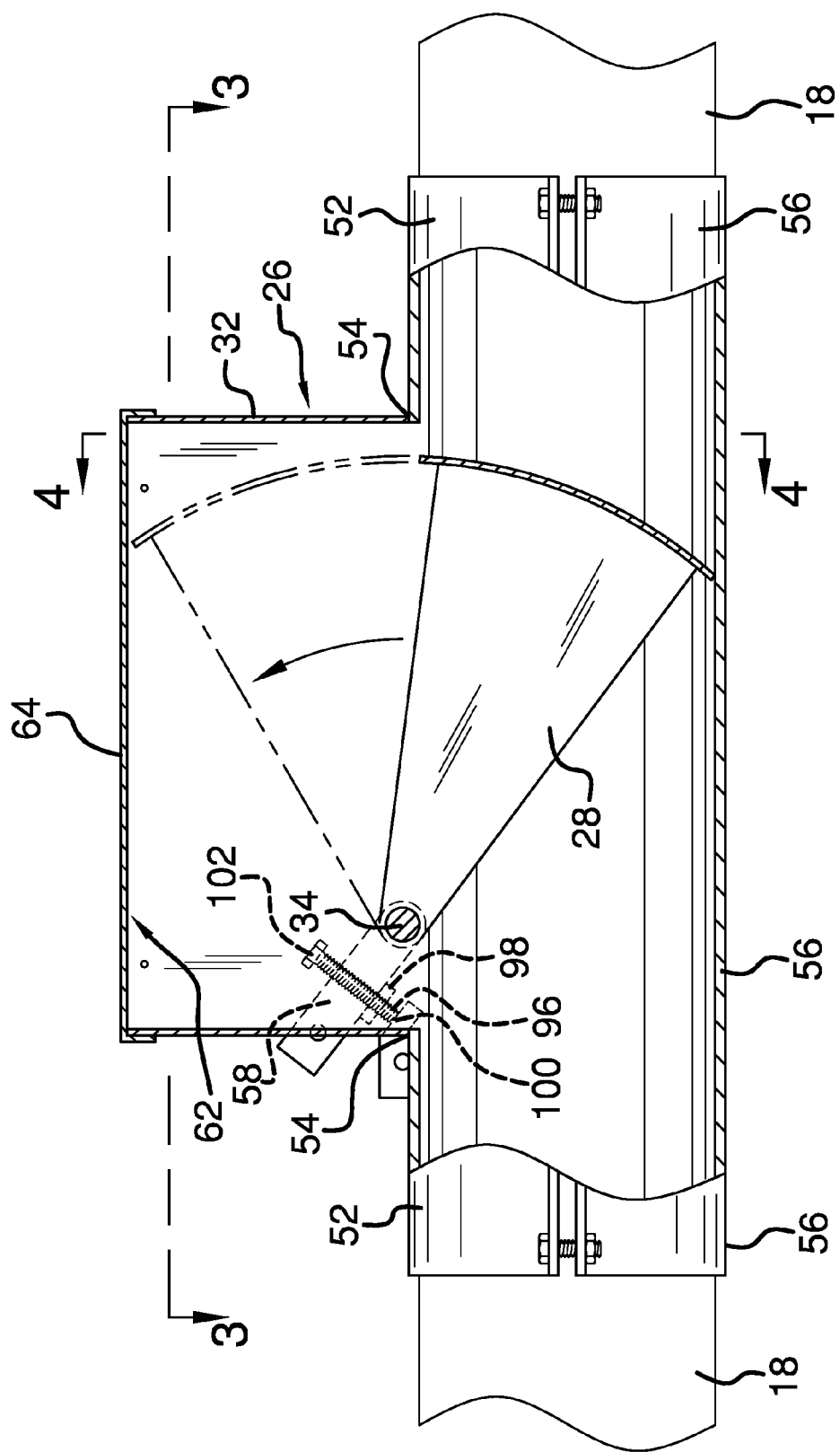
FIG. 2 is a partial cut-away side view of an embodiment of the disclosure.
Figure 3:
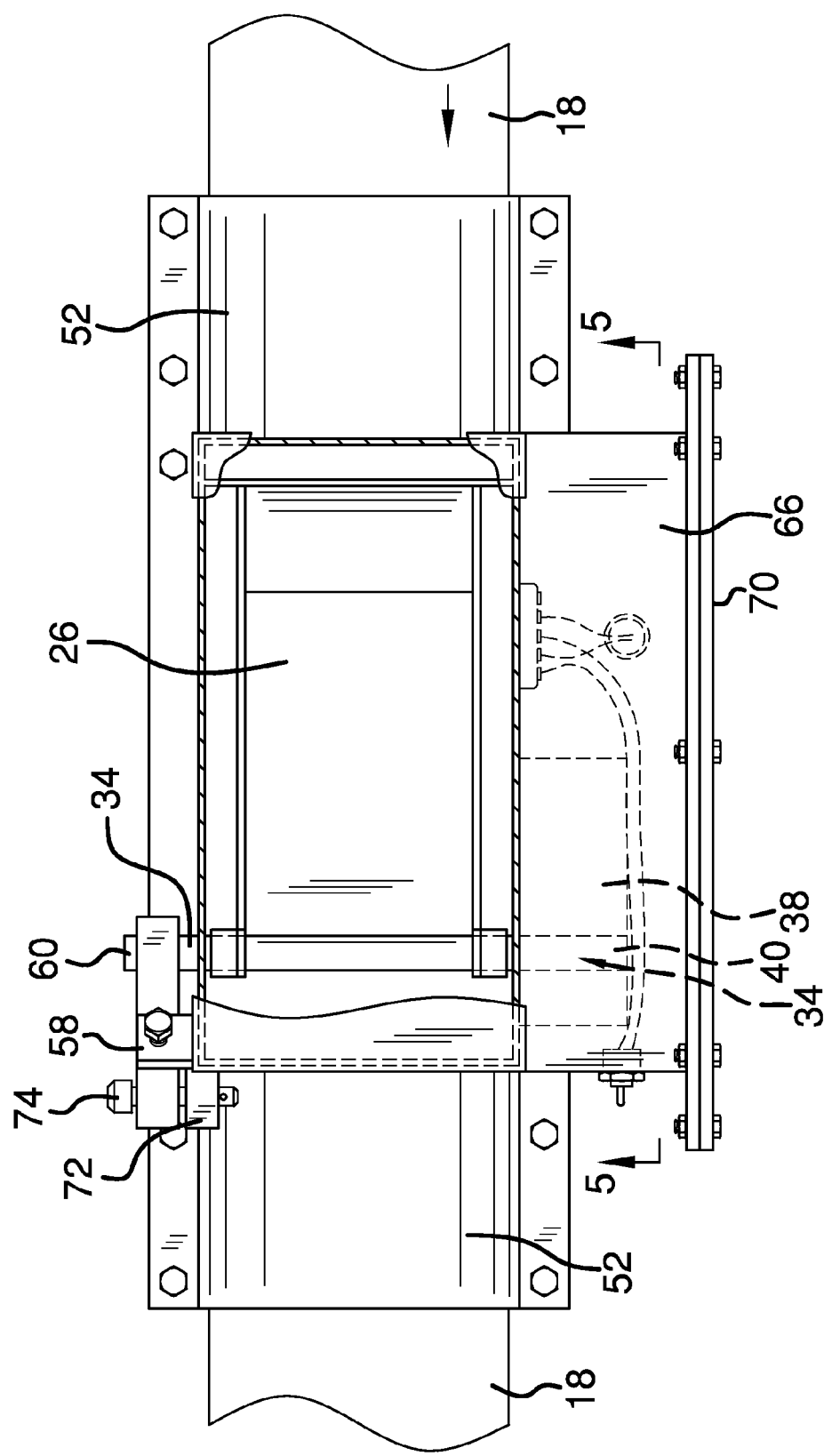
FIG. 3 is a cross-sectional view of an embodiment of the disclosure taken along line 3-3 of FIG. 2.
Figure 4:
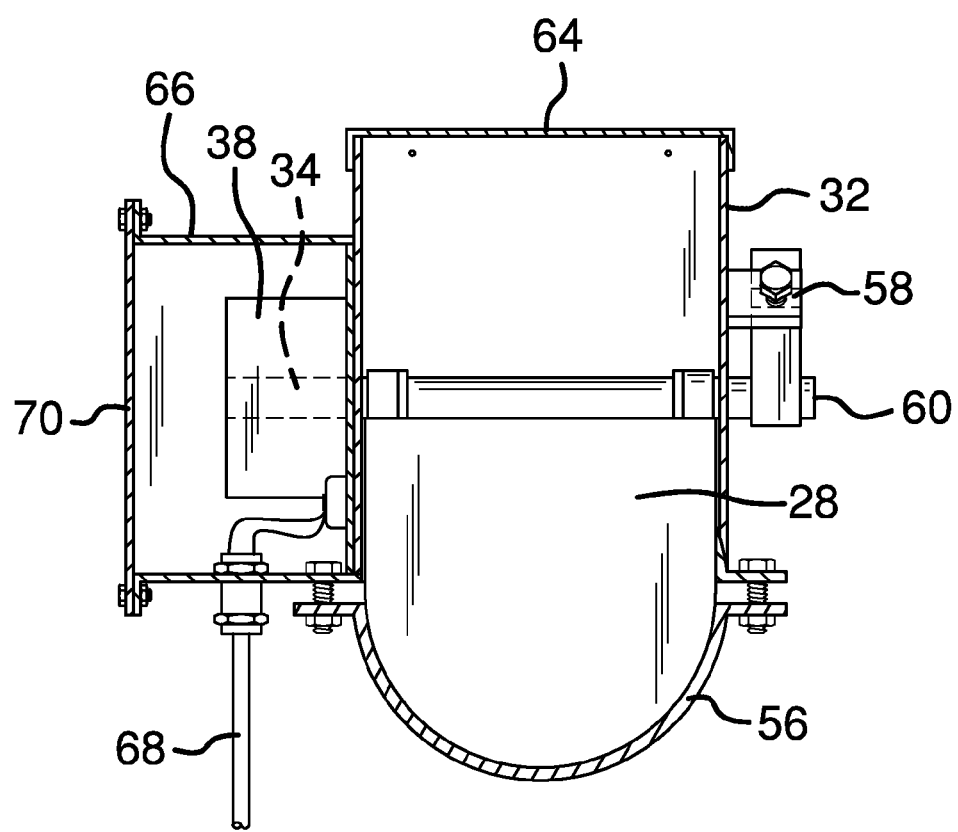
FIG. 4 is a cross-sectional view of an embodiment of the disclosure taken along line 4-4 of FIG. 2.
Figure 5:
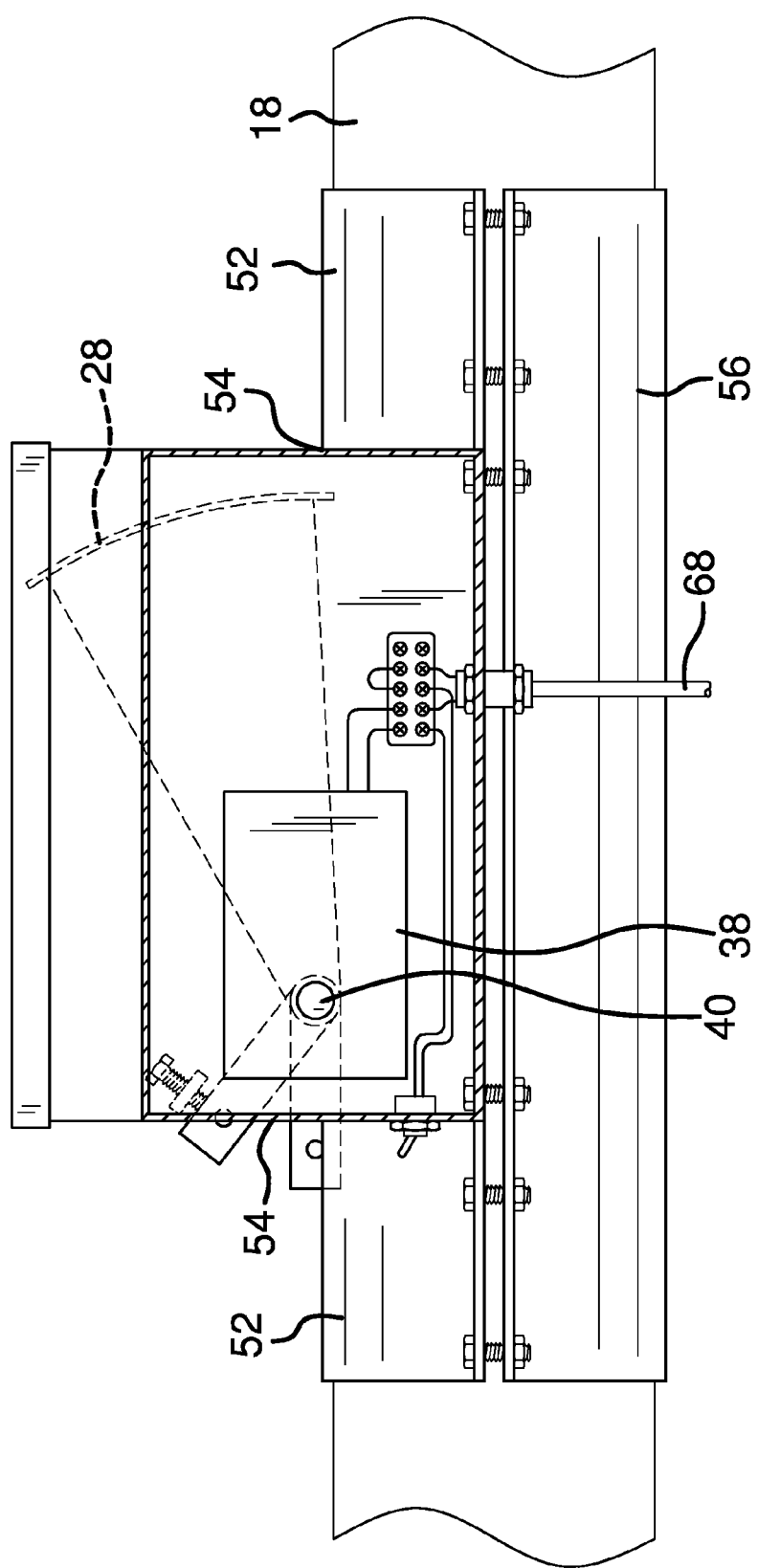
FIG. 5 is a cross-sectional view of an embodiment of the disclosure taken along line 5-5 of FIG. 3.
Figure 6:
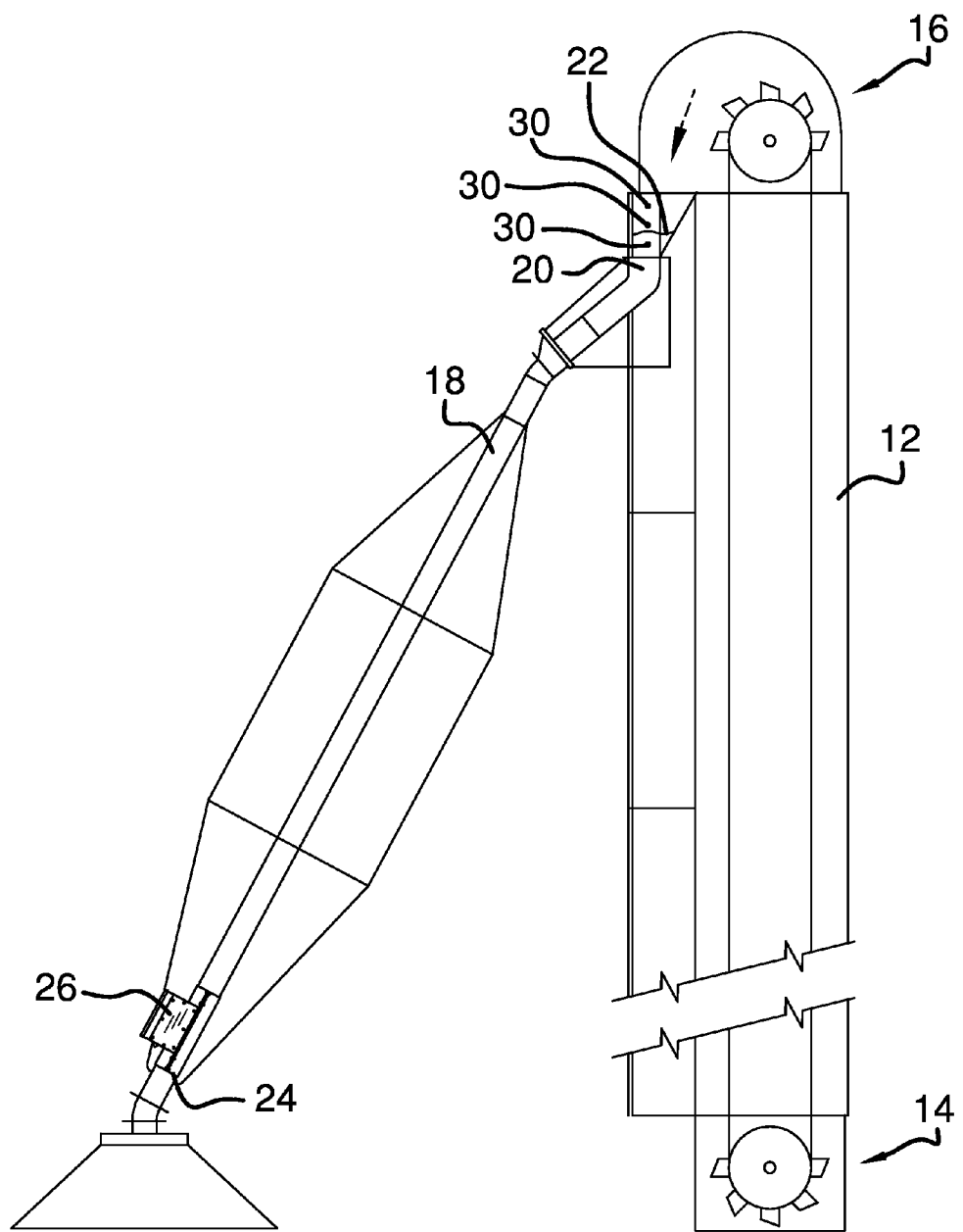
FIG. 6 is a side view of an embodiment of the disclosure in use.

With reference now to the drawings, and in particular to FIGS. 1 through 9 thereof, a new valve device embodying the principles and concepts of an embodiment of the disclosure and generally designated by the reference numeral 10 will be described.

As best illustrated in FIGS. 1 through 9, the grain pipe valve assembly 10 generally comprises a grain elevator 12 having a bottom end 14 and a top end 16. A downspout 18 has an upper end 20 coupled to the top end 16 of the grain elevator 12 wherein the downspout 18 is configured to deliver grain 22 from the top end 16 of the grain elevator 12 through the downspout 18 to and out of a lower end 24 of the downspout 18. A valve 26 is coupled to the downspout 18. The valve 26 is positioned proximate the lower end 24 of the downspout 18. The valve 26 has a swivel gate 28 selectively extendable into the downspout 18 wherein the swivel gate 28 inhibits flow of grain 22 through the downspout 18 sufficient to cause the grain 22 to back up towards the upper end 20 of the downspout 18 as the grain 22 is moved from the grain elevator 12 to the downspout 18.

A sensor 30 may be coupled to the downspout 18. The sensor 30 is positioned in spaced relationship to the valve 26 towards the upper end 20 of the downspout 18 to detect when backflow of grain 22 reaches a predetermined level in the downspout 18. The sensor 30 is operationally coupled to the valve 26 wherein the swivel gate 28 extends into the downspout 18 to maintain backflow of grain to the predetermined level in the downspout 18. The sensor 30 is positioned proximate the upper end 20 of the downspout 18 as the pre-determined level is provided to prevent damage to the grain 22 when the grain 22 falls unrestricted from the upper end 20 of the downspout 18 to the lower end 24 of the downspout 18. Multiple sensors may be employed in spaced relationship along a length of the downspout 18 to enhance the feedback and increase the options for setting the predetermined level. The sensor 30 or sensors and valve 26 may operated through and coordinated by a processor and controls operationally coupled to the valve 26 and the sensor 30. Thus, the level of grain 22 in the downspout 18 may be kept in a defined range between two spaced sensors.

Figure 7:
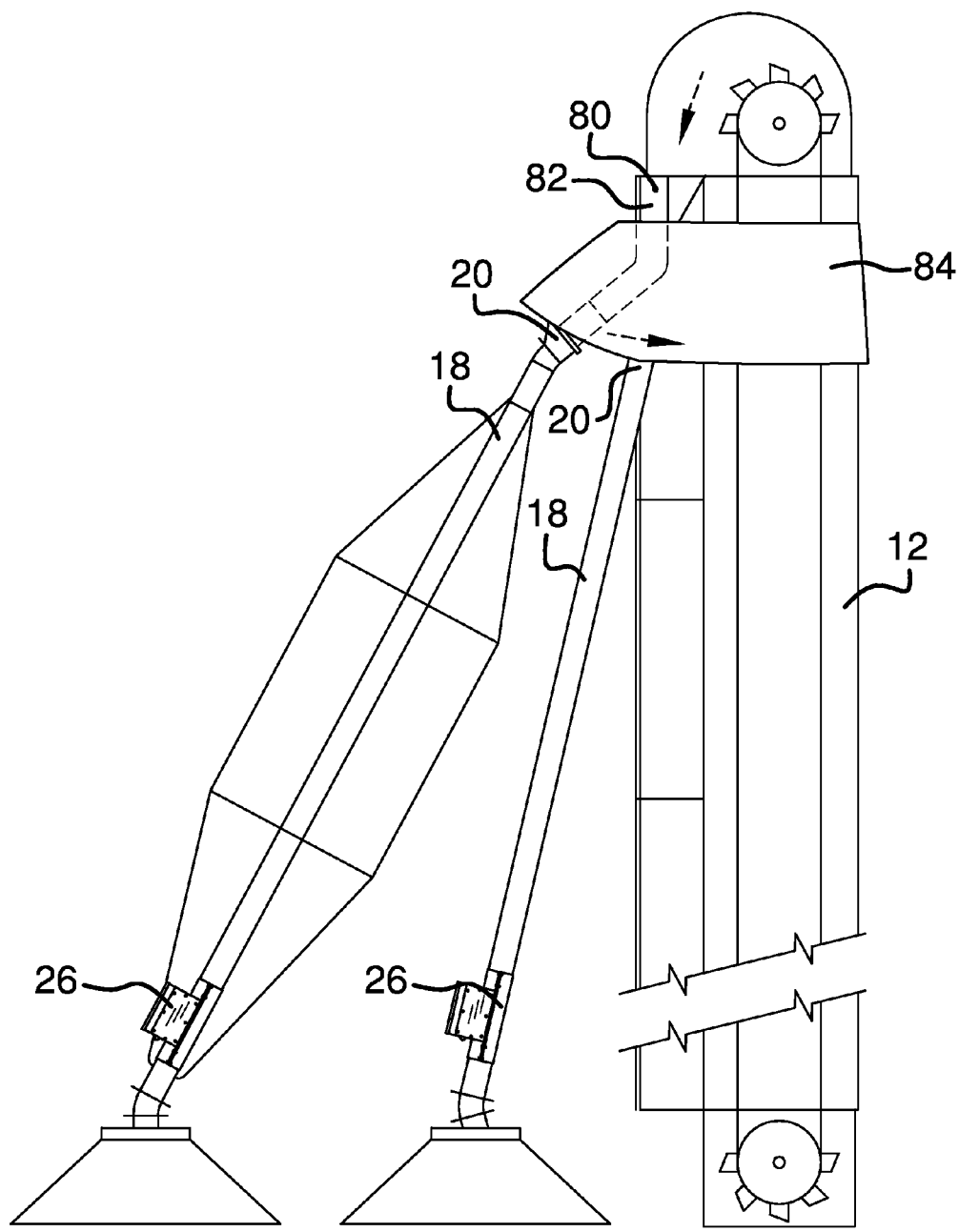
FIG. 7 is a top front side perspective view of an embodiment of the disclosure.
Figure 8:
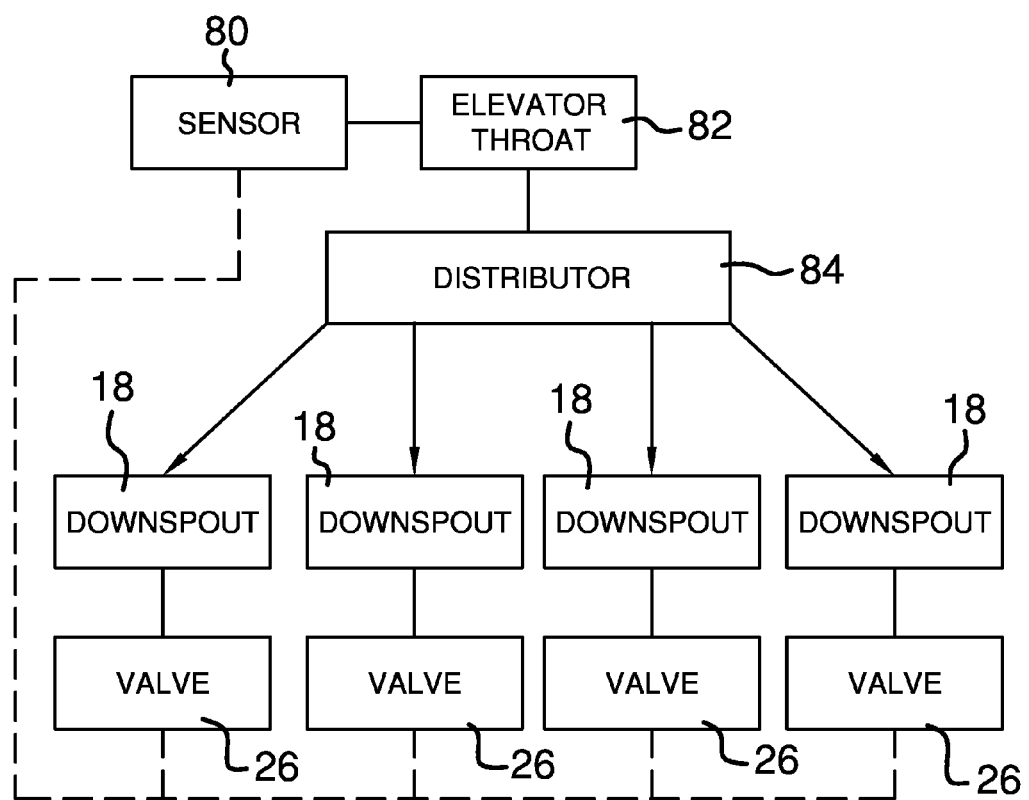
FIG. 8 is a schematic view of an embodiment of the disclosure.

Alternatively, as shown in FIGS. 7 and 8, a sensor 80 may be positioned in an elevator throat 82 through which grain passes into the downspout 18. The valve 26 is operationally coupled to the sensor 80 and controlled in the same manner as described to maintain backflow into the elevator throat 82. A distributor 84 may be positioned between the elevator throat 82 and a plurality of downspouts 18. The sensor 80 may be operationally coupled to a plurality of valves 26 each coupled to an associated one of the downspouts 18. Thus, the sensor 80 may control backflow into the elevator throat for each downspout 18 as selected and aligned with the elevator throat 82 by the distributor 84.

Figure 9:
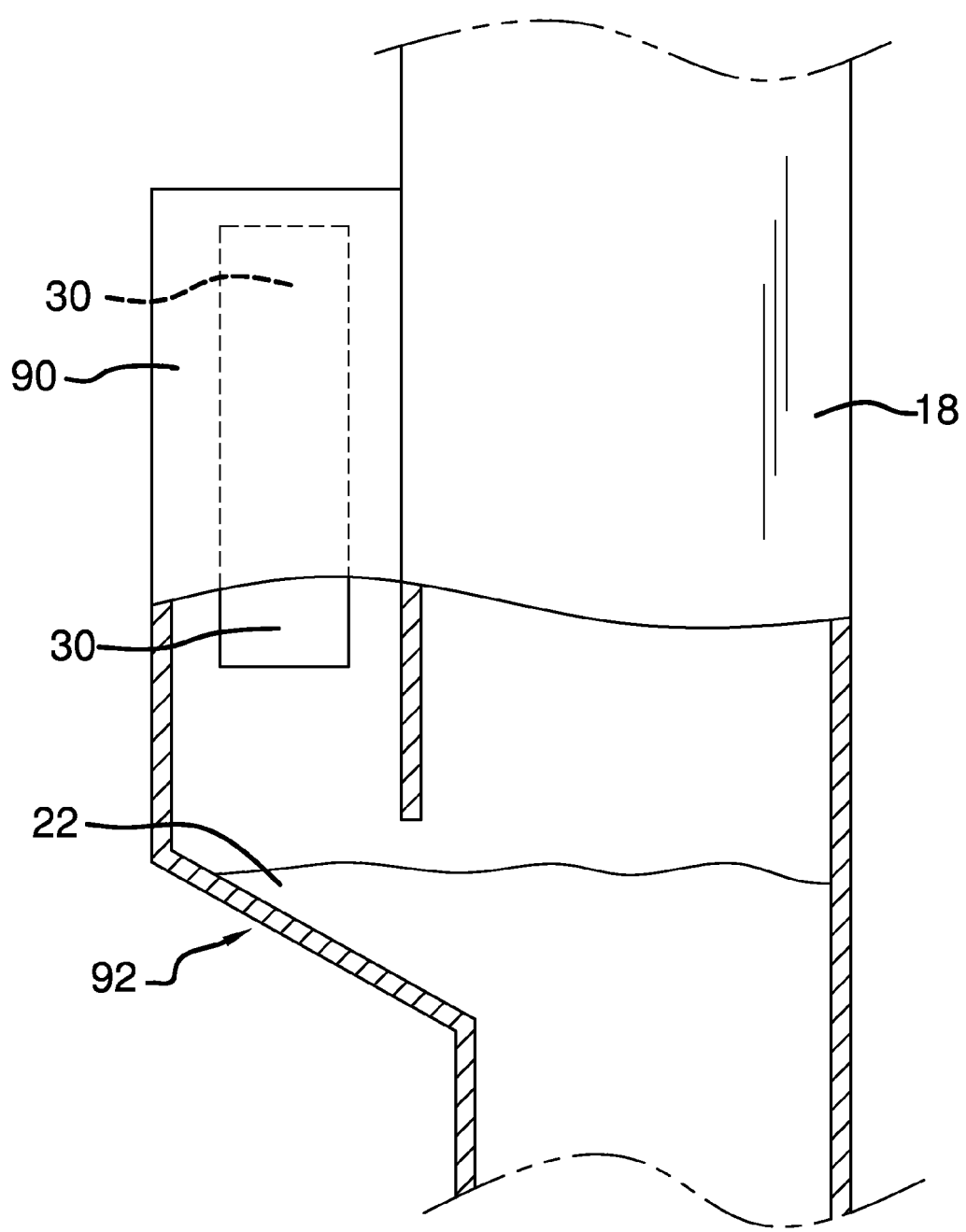
FIG. 9 is a detailed partial cut-away front view of a downspout of an embodiment of the disclosure.

As shown in FIG. 9, a sensor housing 90 may be coupled to the downspout 18. Although not shown specifically, the position of the sensor housing 90 may be on the elevator throat 82 in the same manner shown in FIG. 9. A bottom section 92 of the sensor housing 90 may be tapered extending from a middle of the housing towards the downspout 18 or elevator throat 82. The bottom section 92 of the sensor housing 90 is in environmental communication with the downspout 18 or the elevator throat 82. Thus, when backflow reaches the level within the downspout 18 or elevator throat 82 corresponding to the position of the sensor housing 90, backflow will occupy the bottom section 92 of the sensor housing 90. The sensor 30 is positioned in the sensor housing 90 and directed towards the bottom section 92. Thus, the sensor 30 detects backflow into the bottom section 92 of the sensor housing 90.

The valve 26 generally includes a valve housing 32. The swivel gate 28 is pivotally coupled to the valve housing 32 and extendable from the valve housing 32 into the downspout 18 when the valve housing 32 is coupled to the downspout 18. A pivot arm 34 extends through the valve housing 32. The swivel gate 28 is coupled to and extends from the pivot arm 34. The swivel gate 28 is shaped to conform substantially to the shape of the downspout 18 when the swivel gate 28 is fully extended such that the swivel gate 28 fully obstructs the downspout 18. A motor 38 is coupled to the valve housing 32 and positioned on an outside of the valve housing 32. The motor 38 engages a first end 40 of the pivot arm 34 wherein the motor 38 is operationally coupled to the swivel gate 28 to selectively position the swivel gate 28 relative to the downspout 18 to provide a desired amount of flow restriction through the downspout 18 to maintain the desired level of backflow.

The valve 26 is coupled to the downspout 18 by a clamp 50 coupled to the valve housing 32. The clamp 50 is configured for securing the valve housing 32 to the downspout 18 at a desired location. The clamp 50 has a pair of spaced arcuate top sections 52 coupled to and extending from respective opposite ends 54 of the valve housing 32. The swivel gate 28 extends between the top sections 52 of the clamp 50 into the downspout 18 when the swivel gate 28 is extended from the valve housing 32. The clamp 50 has a bottom section 56. The bottom section 56 of the clamp 50 is arcuate with respect to a longitudinal axis of the clamp 50. Thus, the clamp 50 is configured for extending around the downspout 18.

A counterweight 58 is coupled to a second end 60 of the pivot arm 34 outside the valve housing 32 for facilitating pivoting of the swivel gate 28. A top opening 62 extends through the valve housing 32. A valve lid 64 is removably coupled to the valve housing 32 for selectively closing and opening the top opening 62. Thus, the valve 26 can be cleared as needed. A separate motor housing 66 is coupled to the valve 26. The motor housing 66 covers the motor 38 to preserve and protect the motor 38. A power line 68 may be extended through the motor housing 66 and electrically coupled to the motor 38 or other electronic controls related to operation of the valve 26 and sensor 30. A motor cover 70 is coupled to the motor housing 66. The motor cover 70 is selectively positionable by pivoting or removal to provide access to the motor 38 in the motor housing 66.

An adjustment screw 96 may be coupled to the counterweight 58 outside the valve housing 32. A locking nut 98 is coupled to the adjustment screw allowing an end 100 of the adjustment screw 96 to be positioned at a selectable distance from the counterweight 58. A stop 102 is coupled to the valve housing 32 adjacent to the adjustment screw 96 such that pivoting of the swivel gate 28 into the downspout 18 moves the end 100 of the adjustment screw 96 towards the stop 102. Thus, the adjustment screw 96 may be set to prevent the swivel gate 28 from fully obstructing the downspout 18.

A stop block 72 is coupled to the valve housing 32. The swivel gate 28 is selectively engageable to the stop block 72 by insertion of a locking pin 74 through the counterweight 58 and the stop block 72 wherein the swivel gate 28 is prevented from pivoting into the downspout 18.

In use, the valve 26 is installed on the downspout 18 proximate the lower end 24 and the sensor 30 is positioned proximate the upper end 20 of the downspout 18. Grain 22 is moved from the grain elevator 12 into the downspout 18. The swivel gate 28 inhibits flow of the grain 22 through the downspout 18 until backflow is detected by the sensor 30. Upon detection of a desired amount or level of backflow, the valve 26 is operated automatically to control a flow rate of grain 22 through the downspout 18 to maintain a desired level of backflow. Thus, the grain 22 is prevented from falling precipitously and being damaged.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grain pipe valve assembly comprising:
   a grain elevator having an elevator throat, a bottom end and a top end;
   a downspout having an upper end coupled to said top end of said grain elevator wherein said downspout is configured to deliver grain from said top end of said grain elevator through said elevator throat into said downspout to and out of a lower end of said downspout;
   a valve coupled to the downspout, said valve being positioned proximate said lower end of said downspout, said valve having a swivel gate selectively extendable into said downspout wherein said swivel gate inhibits flow of grain through said downspout;
   a sensor coupled to said elevator throat, said sensor being positioned in spaced relationship to said valve towards said upper end of said downspout to detect when backflow of grain reaches a predetermined level in said elevator throat, said sensor being operationally coupled to said valve wherein said swivel gate extends into said downspout to maintain backflow of grain to the predetermined level in said downspout.

2. The assembly of claim 1, further comprising:
   said downspout being one of a plurality of downspouts selectively couplable to said grain elevator; and
   a distributor coupled between said elevator throat and each said downspout, said distributor diverting grain through a selectable one of said downspouts; and
   a plurality of said valves, each said valve being coupled to an associated one of said downspouts and operationally coupled to said sensor wherein said sensor selectively actuates each said valve to maintain backflow into said elevator throat.

3. The assembly of claim 1, wherein said valve further comprises:
   a valve housing, said swivel gate being pivotally coupled to said valve housing and extendable from said valve housing into said downspout when said valve housing is coupled to said downspout;

a pivot arm extending through said valve housing, said swivel gate being coupled to and extending from said pivot arm; and a motor coupled to said valve housing, said motor engaging said pivot arm wherein said motor is operationally coupled to selectively position said swivel gate relative to said downspout.

4. The assembly of claim 3, further comprising a clamp coupled to said valve housing, said clamp being configured for securing said valve housing to said downspout.

5. The assembly of claim 4, further comprising said clamp having a pair of spaced arcuate top sections coupled to and extending from respective opposite ends of said valve housing, said swivel gate extending between said top sections of said clamp into said downspout when said swivel gate is extended from said valve housing.

6. The assembly of claim 5, further comprising said clamp having a bottom section, said bottom section of said clamp being arcuate with respect to a longitudinal axis of said clamp wherein said clamp is configured for extending around said downspout.

7. The assembly of claim 3, further comprising a stop block coupled to said housing, said swivel gate being selectively engageable to said stop block wherein said swivel gate is prevented from pivoting into said downspout.

8. The assembly of claim 3, further comprising a counterweight coupled to said pivot arm for facilitating pivoting of said swivel gate.

9. The assembly of claim 3, further comprising:
a top opening extending through said valve housing; and
a valve lid removably coupled to said valve housing for selectively closing said top opening.

10. The assembly of claim 3, further comprising a motor housing coupled to said valve, said motor housing covering said motor.

11. The assembly of claim 10, further comprising a motor cover coupled to said motor housing, said motor cover being positionable to provide access to said motor in said motor housing.

12. A grain pipe valve assembly comprising:
a grain elevator having an elevator throat, a bottom end and a top end;
a downspout having an upper end coupled to said top end of said grain elevator wherein said downspout is configured to deliver grain passing through said elevator throat from said top end of said grain elevator through said downspout to and out of a lower end of said downspout;
a valve coupled to the downspout, said valve being positioned proximate said lower end of said downspout, said valve having a swivel gate selectively extendable into said downspout wherein said swivel gate inhibits flow of grain through said downspout;
a sensor coupled to said elevator throat, said sensor being positioned in spaced relationship to said valve towards said upper end of said downspout to detect when backflow of grain in said downspout reaches a predetermined level in said elevator throat, said sensor being operationally coupled to said valve wherein said swivel gate extends into said downspout to maintain backflow of grain to the predetermined level in said downspout, said sensor being positioned in said elevator throat proximate said upper end of said downspout;
a valve housing, said swivel gate being pivotally coupled to said valve housing and extendable from said valve housing into said downspout when said valve housing is coupled to said downspout;
a pivot arm extending through said valve housing, said swivel gate being coupled to and extending from said pivot arm;
a motor coupled to said valve housing, said motor engaging said pivot arm wherein said motor is operationally coupled to selectively position said swivel gate relative to said downspout;
a clamp coupled to said valve housing, said clamp being configured for securing said valve housing to said downspout, said clamp having a pair of spaced arcuate top sections coupled to and extending from respective opposite ends of said valve housing, said swivel gate extending between said top sections of said clamp into said downspout when said swivel gate is extended from said valve housing, said clamp having a bottom section, said bottom section of said clamp being arcuate with respect to a longitudinal axis of said clamp wherein said clamp is configured for extending around said downspout;
a counterweight coupled to said pivot arm for facilitating pivoting of said swivel gate;
a top opening extending through said valve housing;
a valve lid removably coupled to said valve housing for selectively closing said top opening;
a motor housing coupled to said valve, said motor housing covering said motor;
a motor cover coupled to said motor housing, said motor cover being positionable to provide access to said motor in said motor housing; and
a stop block coupled to said housing, said swivel gate being selectively engageable to said stop block wherein said swivel gate is prevented from pivoting into said downspout.

* * * * *